US005085936A

United States Patent [19]

Herdman

[11] Patent Number: 5,085,936

[45] Date of Patent: Feb. 4, 1992

[54] WATERMARKED PAPER SHEET FOR USE IN XEROGRAPHIC IMAGING PROCESSES

[75] Inventor: Peter T. Herdman, High Wycombe, England

[73] Assignee: The Wiggins Teape Group Limited, Basingstoke, England

[21] Appl. No.: 295,375

[22] Filed: Jan. 10, 1989

[30] Foreign Application Priority Data

Jan. 18, 1988 [GB] United Kingdom ................. 8801044
Jul. 14, 1988 [GB] United Kingdom ................. 8817113

[51] Int. Cl.[5] ......................... B32B 29/06; B05D 5/06

[52] U.S. Cl. .................................... 428/337; 428/199; 428/211; 428/537.5; 101/491; 427/288; 346/135.1

[58] Field of Search ...................... 428/537.5, 337, 199, 428/211

[56] References Cited

U.S. PATENT DOCUMENTS 3,085,898 4/1963 Vaurio ............................... 428/199
4,600,629 7/1986 Knapp et al. ................... 428/918 X
4,778,711 10/1988 Hosomura et al. ................. 428/211

FOREIGN PATENT DOCUMENTS 2097011 3/1972 France .
2588583 4/1987 France .
62-30079 2/1987 Japan .

OTHER PUBLICATIONS

Green et al., "Reduction of Toner Distrubances by the Use of Sodium Sulfate", Xerox Disclosure Journal, vol. 2, No. 3, May/Jun. 1977.

*Primary Examiner*—P. C. Sluby
*Attorney, Agent, or Firm*—Burns, Doane, Swecker & Mathis

[57] ABSTRACT

A watermarked paper sheet for use in a xerographic ion deposition or magnetographic printing process, in which the sheet has print receiving and reverse sides, the print receiving side of the sheet having a surface resistivity of between $5\times10^{10}$ and $5\times10^{12}$ ohms per square and a Bendsten roughness of not more than 300 milliliters, and the reverse side being formed with a watermark.

8 Claims, 1 Drawing Sheet

WATERMARKED PAPER SHEET FOR USE IN XEROGRAPHIC IMAGING PROCESSES

Figure 1:
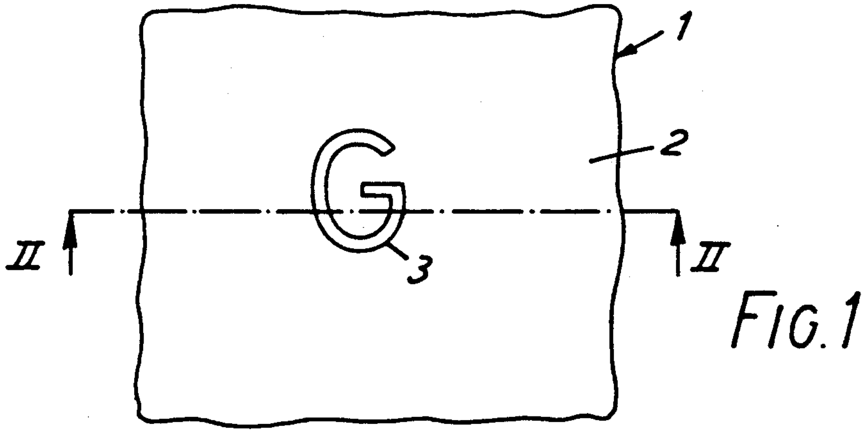

This invention relates to watermarked and/or "laid" paper for use in xerographic magnetographic, ion deposition, and especially laser xerographic imaging processes.

The conventional xerographic process for producing copies from a master on plain paper operates by forming on a suitable receptor surface an electrostatic optically generated image of the master, dusting the image with a fusible coloured toner, transferring the toner image to a sheet, usually but not necessarily of plain paper, and fusing the toner to the sheet by the application of heat and/or pressure.

In an extension of the xerographic process however, the electrostatic image is not formed optically from a master, but by means of a laser driven from the memory of a computer or word processor. The laser thus reproduces on the receptor surface an electrostatic negative image of the material contained in the memory.

Laser xerographic printing can thus be substituted for impact or ink jet printing as currently used for producing hard copy derived from computers or word processors. In particular, it can be used by secretarial staff for producing individually typed letters for which, unlike conventional xerographic copying, watermarked and laid papers are frequently used.

For conventional xerographic printing, an unwatermarked paper is generally used in which the roughness, moisture content and surface resistivity are carefully controlled. These properties are predominantly concerned with ensuring that stable electrostatic conditions are maintained during the xerographic process.

The conventional watermarked and laid papers as used in office correspondence have moisture contents controlled only at a level conventional for paper, typically about 7%, and surface resistivity is unspecified. Moreover, the watermarks and laid lines are formed on the surface of the sheet intended for imaging.

Conventional watermarked paper as described above is satisfactory for impact printing, but can lead to unsatisfactory results when used in xerographic, ion deposition, magnetographic and laser xerographic printing processes. Its use can destabilise the electrostatic image. Also the surface irregularities resulting from the presence of watermarks and laid lines on the surface of the sheet result in imperfect contact between the receptor surface to the sheet, and therefore imperfect transference of the toner image. Furthermore the nature of the heat fusing process requires intimate contact between the sheet and the fusing system which the above mentioned surface irregularities preclude.

It is among the objects of the present invention to provide a watermarked paper which will facilitate the satisfactory formation thereon of an image by ion deposition, magnetographic of xerographic printing process.

The invention therefore provides watermarked paper sheet for use in a xerographic ion deposition or magnetographic printing process, said sheet having print receiving and reverse sides, the print receiving side of the sheet having a surface resistivity of between $5\times10^{10}$ and $5\times10^{12}$ ohms per square and a Bendsten roughness of not more than 300 milliliters, and the reverse side being formed with a watermark.

The moisture content of the sheet should be in the range of from 4% to 6%, preferably not more than 5.5% and optimally not more than 5%.

The Bendsten roughness is measured according to British Standard BS 4420 (ISO Standard No. 2494) and is preferably in the range 160 to 250 milliliters.

The term "watermark" as used in this specification is to be understood as extending both to patterning such as laid lines and to trade marks and the like, applied as watermarks by a dandy roll or other means. Watermarks which are unsymmetrical or in the form of words are applied as a negative image to the reverse side of the sheet so as to present a positive image when viewed from the print receiving side.

Figure 2:
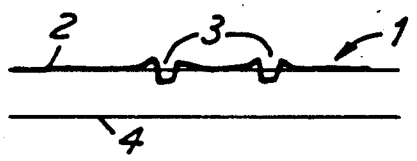
Figure 3:
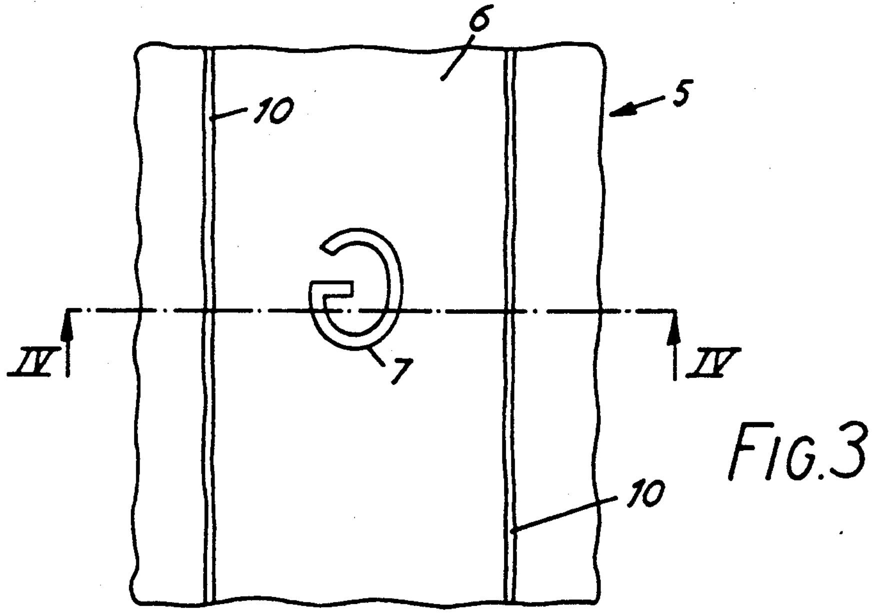
Figure 4:
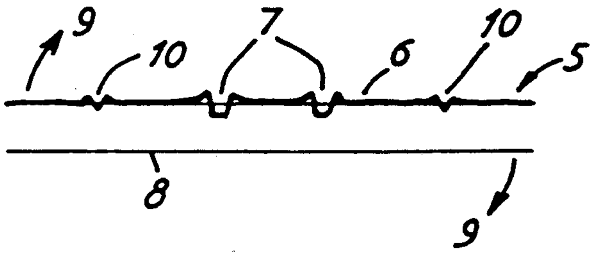

The invention will now be further described with reference to the accompanyiny drawings in which:

FIG. 1 is a view of part of the print receiving surface of a conventional watermarked paper sheet, FIG. 2 is a view on the line II—II FIG. 1, showing the sheet exaggerated in thickness for clarity, FIG. 3 is a view on part of the print receiving surface of a watermarked paper sheet according to the invention and, FIG. 4 is a view on the line IV—IV of FIG. 3, showing the sheet exaggerated in thickness for clarity.

Referring first to FIGS. 1 and 2, the sheet 1 is formed on its print receiving surface 2 with a watermark 3 in the form of a stylized letter "G" while the reverse side 4 remains smooth.

Turning now to FIGS. 3 and 4, the sheet 5 is formed on its reverse surface 6 with a watermark 7 again in the form of a stylized letter "G", but as a negative image, whilst the print receiving surface 8 remains smooth. If the sheet 5 is inverted by turning in the direction of the arrows 9, as shown in FIG. 4, it will present a watermark appearing essentially the same as the watermark 3 in FIG. 1, but formed on the surface which does not receive the printed image. A smooth surface is therefore maintained for the reception of the xerographic ion deposition or magnetographic print.

It will be appreciated that laid lines can also be provided on the reverse surface of the sheet in addition to, or in the absence of the watermark 7, as seen at 10 in FIGS. 3 and 4.

For satisfactory use in xerographic ion deposition or magnetographic printing processes, the sheet should have a moisture content of between 4% and 6%, preferably not more than 5.5% and optimally not more than 5%. The print receiving side 8 of the sheet should have a Bendsten roughness of not more than 300 milliliters and a surface resistivity of between about $5\times10^{10}$ and $5\times10^{12}$ ohms per square. Preferably, the Bendsten roughness is between 160 and 250 milliliters.

I claim:

1. A watermarked paper sheet for use in a xerographic ion deposition or magnetographic printing process, in which the sheet has print receiving and reverse sides, the print receiving side of the sheet having a surface resistivity of between $5\times10^{10}$ and $5\times10^{12}$ ohms per square and a Bendsten roughness of not more than 300 milliliters, and the reverse side being formed with a watermark.

2. A watermarked paper sheet as claimed in claim 1, in which the Bendsten roughness is in the range 160 to 250 milliliters.

3. A watermarked paper sheet as claimed in claim 1, in which watermarks which are unsymmetrical or in the form of words are applied as a negative image to the reverse side of the sheet so as to present a positive image when viewed from the print receiving side.

4. A watermarked paper sheet for use in a xerographic ion deposition or magnetographic printing process, in which the sheet has print receiving and reverse sides, the print receiving side of the sheet having a surface resistivity of between $5\times10^{10}$ and $5\times10^{12}$ ohms per square and a Bendsten roughness of not more than 300 milliliters, the sheet having a moisture content in the range of 4% to 6%, and the reverse side being formed with a watermark.

5. A watermarked paper sheet as claimed in claim 4, in which the moisture content is not more than 5.5%.

6. A watermarked paper sheet as claimed in claim 5, in which the moisture content is not more than 5%.

7. A watermarked paper sheet as claimed in claim 4, in which the Bendsten roughness is in the range 160 to 250 milliliters.

8. A watermarked paper sheet as claimed in claim 4, in which watermarks which are unsymmetrical or in the form of words are applied as a negative image to the reverse side of the sheet so as to present a positive image when viewed from the print receiving side.

* * * * *